(12) United States Patent
Tunney

(10) Patent No.: US 7,257,254 B2
(45) Date of Patent: Aug. 14, 2007

(54) METHOD AND SYSTEM FOR RECOGNIZING TIME

(75) Inventor: William Patrick Tunney, Montreal (CA)

(73) Assignee: SAP AG, Walldorf (DE)

( * ) Notice: Subject to any disclaimer, the term of this patent is extended or adjusted under 35 U.S.C. 154(b) by 741 days.

(21) Appl. No.: 10/625,659

(22) Filed: Jul. 24, 2003

(65) Prior Publication Data

US 2005/0018998 A1    Jan. 27, 2005

(51) Int. Cl.
G06K 9/00    (2006.01)
(52) U.S. Cl. .................. 382/181; 346/80; 346/81; 382/112; 382/188; 715/541; 345/179
(58) Field of Classification Search ........ 382/112–113, 382/181–182, 209, 187–188, 203, 371, 218, 382/317; 345/179–181, 173; 343/356–257; 346/80–81; 434/256–257; 715/500, 541
See application file for complete search history.

(56) References Cited

U.S. PATENT DOCUMENTS 6,081,261 A * 6/2000 Wolff et al. ............... 345/179

6,666,376 B1 * 12/2003 Ericson ..................... 235/454

OTHER PUBLICATIONS

IBM Research, "Pen Technologies"; Retrieved from the Internet: Nov. 6, 2003< URL: http://www.research.ibm.com/electricInk/>.
Gyricon, LLC., "SmartPaper", Retrieved from the Internet Nov. 10, 2003<URL http://www.gyriconmedia.com/technology.asp>.

* cited by examiner

Primary Examiner—Matthew C. Bella
Assistant Examiner—Shefali Patel
(74) Attorney, Agent, or Firm—Kenyon & Kenyon LLP

(57) ABSTRACT

A method and system for recognizing time. An embodiment of a method for recognizing a time includes receiving a set of coordinates from a capture device, the set of coordinates indicating where a set of marks was made on a paper form without the use of a graphical user interface, and mapping the set of coordinates to a time. The method enables a processor to accurately and quickly determine time information entered on a piece of paper attached to the capture device, independent of the user who enters the time information. Exemplary applications include a field survey and inventory.

13 Claims, 5 Drawing Sheets

FIG. 3

METHOD AND SYSTEM FOR RECOGNIZING TIME

BACKGROUND

Handwriting recognition software has made it possible to digitally capture handwriting and transform it into digital characters using an input capture device and a computer. The capture device may be a flat panel device that allows a user to enter normal handwritten notes onto a piece of paper attached to the capture device while information about the coordinates of the pen strokes is digitally recorded by the capture device. The capture device can later upload the digitally recorded handwritten notes into a computer where an uploading program receives and stores the handwriting strokes in memory, resulting in two copies of a document, namely the original handwritten version and a second, digitally encoded version.

Digital handwriting capture is useful when data must be entered into a computer program for processing, but original handwritten copies must be retained for legal or verification purposes. In these instances, it would be helpful to have handwriting automatically transformed into digital characters and transferred to a computer program without manual data entry. This may be achieved by placing a printed paper form with clearly defined input fields on a capture device, digitally capturing the handwritten notes in these input fields on the capture device, and uploading the digital notes to the computer. A recognition program may then interpret the digitally recorded handwritten notes within these input fields and transform them into a digitally encoded representation, which can be automatically entered into the computer program in the same manner as if the notes were manually entered via a keyboard.

However, the problem with these systems is that handwriting recognition software is generally not 100% accurate. Conventionally, an accuracy of approximately 90% can be reached, but only after a user has gone through a series of arduous user-specific training sessions that allow the recognition software to adjust to the style of a particular user. So, time is lost by having to train the software. But, even so, there may still be multiple transformation errors because of the margin for error in current handwriting recognition software.

Errors are particularly prevalent when a user enters time information in numerical form. For example, if an input field is provided for time entry and no format is given, a user may enter the time in one of many formats. For example, midnight may appear as 0:00, 12:00, 12:00 AM, or 12.00. The ambiguous nature of the time field results in difficulty in resolving handwritten input as a time understood by the computer program that will later use this information. Additionally, even if separate fields are provided for hours and minutes and the expected format is clearly marked on the printed form, users may still unintentionally enter the time in an incorrect format if they ignore this additional instruction.

Finally, even if users correctly follow the format required, other difficulties may arise when resolving individual numbers. Different cultures may write numbers differently. For example, the handwritten German 1 closely resembles a 7, and is interpreted as such by handwriting recognition software developed in the U.S. Or handwriting recognition engines may lack robustness in interpreting numbers. For example, handwriting recognition engines that are trained on a specific user's input may not correctly interpret hastily written numbers by the specific user and can not at all interpret numbers from a different user. In some cases, the number 8 could easily be interpreted as the letter B.

Some systems have tried to solve these problems with time recognition by providing graphical user interfaces through which a user may select time information from pull-down menus. In these systems, a more complex input/output device than the capture device must be used to display the graphical user interfaces. Such a device could be expensive and too bulky to carry, particularly for field surveys, field inventory, etc., for which the capture device is ideally suited.

Accordingly, there is a need in the art for a simple and natural way to improve the recognition accuracy of time information entered by a user onto printed paper forms attached to capture devices independent of the user who inputs the information.

SUMMARY OF THE INVENTION

Embodiments of the present invention provide a simple and natural method to improve recognition of time information. These embodiments provide time information by making marks on a paper data form corresponding to the hour, minute, and AM/PM, while a capture device captures when and where on the paper data form the marks were made. A method includes a processor receiving capture data from the capture device, where the capture data represents positions of a set of marks made on paper overlaying a face of the capture device. The method further includes the processor comparing the capture data with one of a plurality of unique positions stored in memory in association with a plurality of clock times printed on the paper and retrieving from memory the clock time associated with the unique position that matches the capture data. The method then includes the processor storing the retrieved clock time in memory as the set of marks made on the paper. The capture data is advantageously generated by simply using a piece of paper and the capture device without having to rely on more complex, bulky,devices with graphical user interfaces.

Embodiments of the present invention also provide a system through which time information may be recognized. The system may include a memory and a processor for receiving capture data corresponding to a set of marks made on a paper data form attached to a capture device and mapping the capture data to a time.

BRIEF DESCRIPTION OF DRAWINGS

FIG. 3 is an exemplary paper data form that includes time information to be filled out according to an embodiment of the present invention.

DETAILED DESCRIPTION

Embodiments of the present invention provide a method and system for recognizing time information from a paper data form attached to a capture device. Time information on the paper may be in the form of a clock face minus the hands and a pair of boxes for "AM" and "PM." A user may simply draw the hands on the clock and fill in one of the boxes corresponding to the correct time. The capture device may digitally capture the pen strokes the user makes when drawing the hands and filling in the box and upload this capture data to a computer for time recognition according to embodiments of the present invention Exemplary applications of these embodiments include field surveys, field inventory, and other applications where paper forms are the predominant way data is recorded and device portability and ease of use are preferable.

In embodiments of the present invention, the computer's processor may receive the capture data from a capture device to which a paper data form was previously attached. The capture data format may be a time ordered sequence of (x,y) coordinates, indicating when and where on the data form a set of marks (or pen strokes) was made to fill in the correct time. This capture data may then be compared to a set of predefined coordinates stored in the computer's memory which indicates the expected positions of each hour, minute, and AM/PM on the data form. The p redefined data that matches the capture data may be determined and the corresponding hour, minute, and AM/PM stored in memory for later use; hence, the time is recognized. In an alternate embodiment, the capture data format may be a sequence of vectors (x, y, t) or any format that appropriately represents the user's pen strokes.

Instead of having to rely on handwritten numbers or a variety of time formats, embodiments of the present invention may use unique positions of time information printed on paper to determine the time. Accordingly, these embodiments advantageously provide a simple and natural way to accurately recognize time information. Problematic handwriting recognition need not be done, resulting in reduced data ambiguity and improved speed of data entry.

Figure 1:
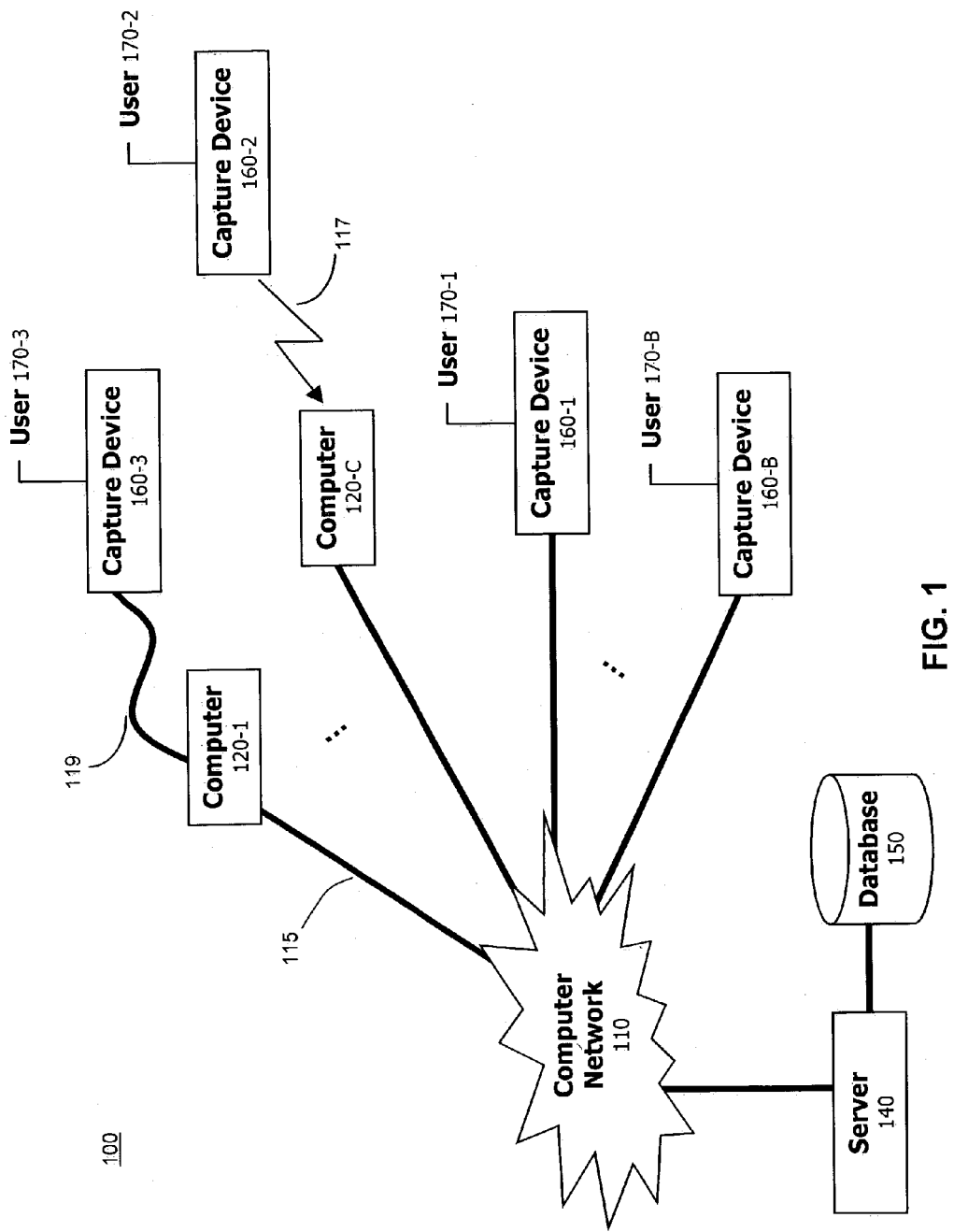
FIG. 1 is an exemplary computer network used to recognize the time according to embodiments of the present invention.

FIG. 1 shows an embodiment of an exemplary network that may be used to implement embodiments of the present invention. The exemplary network system 100 may include, but is not limited to, a computer network 110, computers 120-1 through 120-C, where C is an integer, capture devices 160-1 through 160-B used by users 170-1 through 170-B, where B is an integer, to input time information, a server 140, and a database 150 storing various time coordinates used by the computers. These components may be linked to the network 110 via network links 115. The network 110 may be a LAN, WAN, Internet, or any like structure capable of connecting components and transmitting data. The network links 115 may include physical wiring, wireless connections, or any likes transmission configuration capable of transmitting data. Alternatively, a capture device 160 may be directly linked via a wireless link 117, a COM cable 119, or any like connector, to a computer 120.

The capture device used in embodiments of the present invention may include a portable input device whose appearance and operation resembles that of a traditional clipboard. The capture device may include a flat panel onto which a piece of paper may be attached and pens used to write on the paper thereby entering data to the capture device. The paper generally replaces a graphical user interface that is included in most input devices. So, typically, the capture device does not include a graphical user interface. The pen strokes made on the paper may be stored in memory on the capture device for later uploading to a computer via a modem, cable, or other transmission device in communication with a port of the capture device. An example of the capture device is the CrossPad™ manufactured by IBM.

In an embodiment, the capture device may include software for interacting with a user and for uploading capture data to the computer. The capture device may include a series of built-in buttons that may be configured to initiate given commands. For example, capture data may be uploaded to the computer via the wireless link, COM cable, or the like, by the user pressing some of the buttons to initiate the upload process. After the upload completes, the user may delete the capture data from the capture device. The capture device may include a small text-based display to show short text messages to the user.

In an alternate embodiment, the capture device may include local intelligence for performing recognition and uploading the recognized data to the computer for further processing.

Since digital handwriting capture, is not limited to physical flat panel devices, in another alternative embodiment the capture device may include electronic reusable paper, for example. Electronic reusable paper is designed to have the look and feel of normal paper, except that it contains tiny sensor network technologies that provide digital display and capture of handwritten notes. Similar to a flat panel device, data can be captured, except that in the case of electronic reusable paper that data is collected and stored by the paper itself. Data collection from electronic reusable paper may be implemented in many ways, including attaching the paper to a clipboard containing the electronics required to retrieve data from the electronic reusable paper and forwarding the data obtained using standard methods. An example of electronic reusable paper is SmartPaper manufactured by Gyricon LLC.

Figure 2:
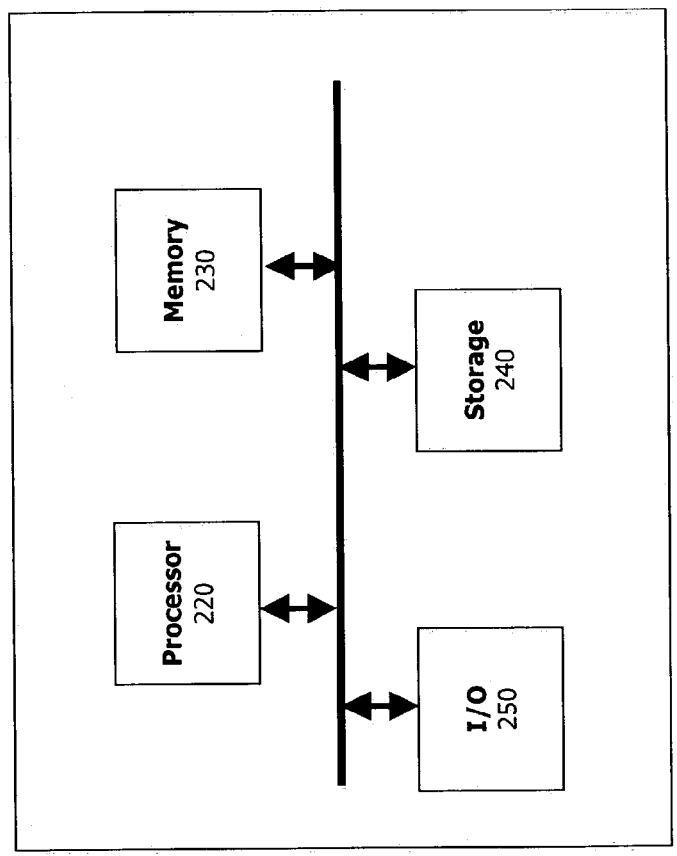
FIG. 2 is an exemplary computer used to recognize the time according to embodiments of the present invention.

FIG. 2 is a block diagram of an exemplary computer that can implement embodiments of the present invention. The computer 200 may receive capture data from the capture device according to embodiments of the present invention. The computer 200 may include, but is not limited to, a processor 220 provided in communication with a system memory module 230, a storage device 240, and an I/O device 250. The processor 220 may perform data recognition with the capture data received from the capture device. The memory 230 may store program instructions to be executed by the processor 220 and also may store variable data generated pursuant to program execution. In practice, the memory 230 may be a memory system including one or more electrical, magnetic, or optical memory devices. The I/O device 250 may include a docking station for interface to the capture device 160 to receive the capture data and transmit any other appropriate data between the capture device 160 and the computer 200.

In embodiments of the present invention, a paper form may have printed thereon time information, including hour, minute, and AM/PM. Each possible value for hour, minute, and AM/PM may occupy a unique spatial position on the paper form. When a user marks a time on the form by selecting an hour, minute, and AM/PM, the positions of the user's marks are unique to that time. These positions may be captured by the capture device and later uploaded to a computer for processing. Hence, the computer may determine the clock time based on these unique positions.

Figure 3:
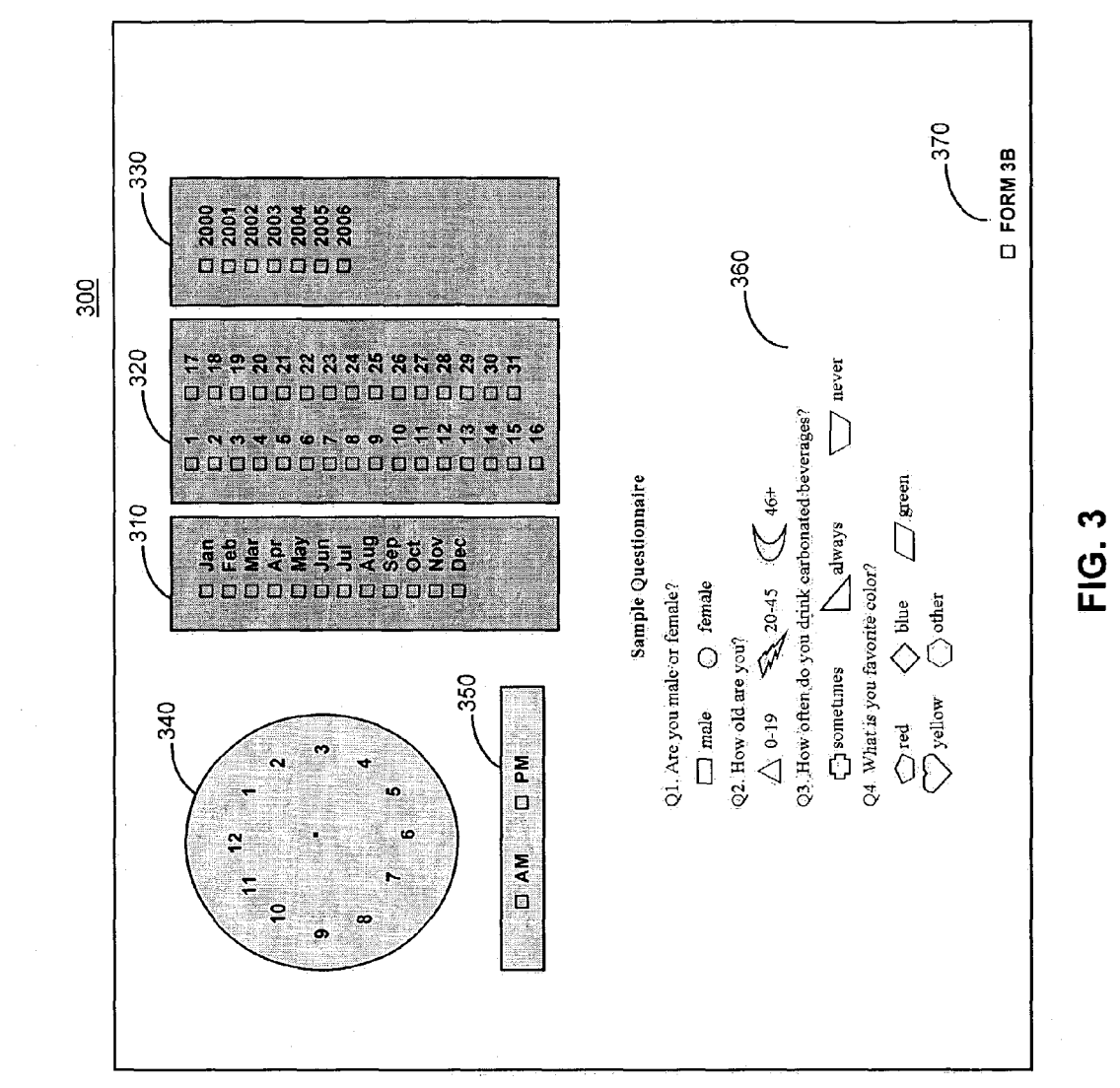
Figure 4:
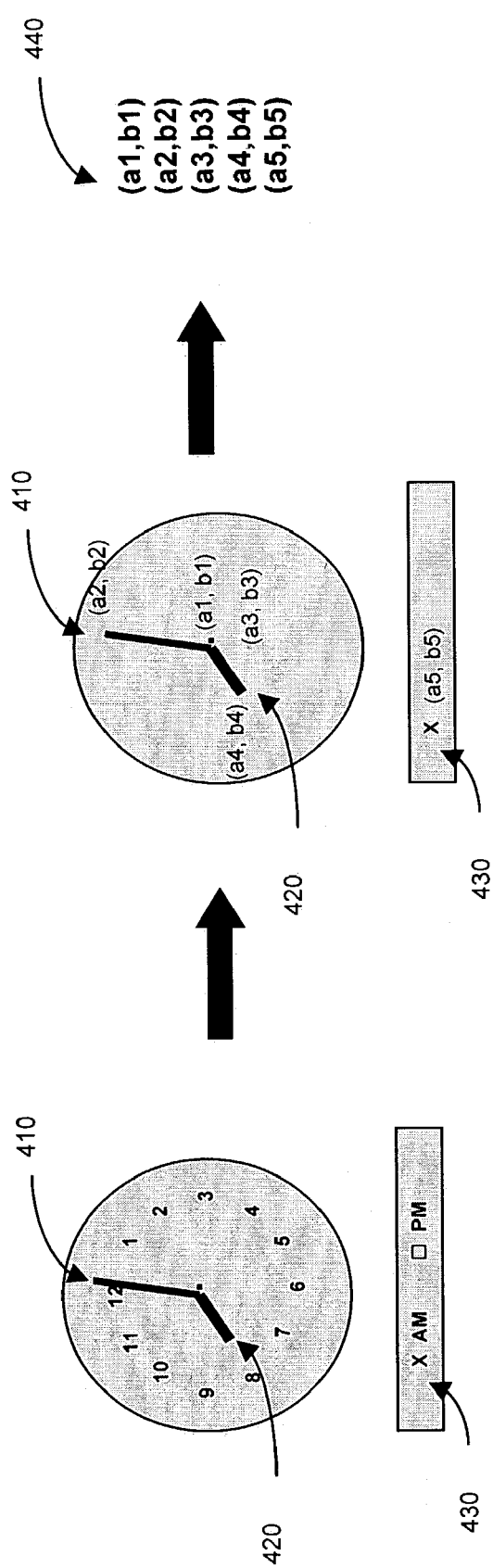
FIG. 4 is an exemplary data capture format according to an embodiment of the present invention.

FIG. 3 is an example of a paper data form in which the time information is printed in unique positions as described. In this example, the data form 300 may include, but is not limited to, time information comprising a clock face 340 and a pair of boxes 350 listing "AM" and "PM." Each component 340, 350 occupies a unique position on the data form 300, which, when marked by the user, may be used to determine clock time based on that position of the mark. FIG. 4 will further illustrate this.

The data form 300 may also include date information comprising a first group of boxes 310 listing the 12 months in a year, a second group of boxes 320 listing 31 days in a month, and a third group of boxes 330 listing a current span of years. The data form 300 may also include a survey 360 to be filled out and the identification 370 of the data form.

The data form 300 may be attached to the capture device 160 and the correct time filled in by drawing the hands on the clock face 340 and filling in one of the boxes 350. The coordinates of the marks made may be recorded on the capture device 160 and later uploaded to the computer 120 for processing according to embodiments of the present invention. An hour and minute hand may be drawn outward from the center point of the clock face 340 to the appropriate positions. As with traditional clocks, the minute hand should be longer than the hour hand. In the instance when the two hands overlap, for example, at 1:05, 2:10, etc., the minute and hour hands may be drawn on top of each other with the minute hand drawn longer. In this case, the capture device 160 will capture the two drawn hands with similar, but different, outer end point coordinates. The box 350 may be filled in by shading the entire box or making a checkmark, an "X," or any discernible indicator that the box has been selected.

To accurately capture the correct coordinates of the time information, the data form 300 should first be properly oriented on the capture device 160 and firmly attached to prevent movement. In one embodiment, a border or like markers may be printed on the face of the capture device-indicating where the data form 300 should be attached. Alternatively, the data form 300 may have printed in each corner a hash mark or like markers. A user first would write on the paper form at the hash marks prior to marking the form with time information. The coordinates of these hash marks may be captured and uploaded to the computer where used as reference points for the coordinates of the time information.

Different data forms 300 may have the time information 340, 350 in different positions and/or formats on the form. Hence, the identification 370 of the data form may be uploaded to the computer 120 so that the computer 120 may retrieve the appropriate predefined coordinates. In one embodiment, the form identification 370 may have a uniquely positioned box associated with it to be filled in by the user. The coordinates of the filled-in identification box may indicate to the computer 120 which data form is being used.

It is to be understood that the layout of the time information on the form is not limited to a clock face and an AM/PM box, as shown in FIG. 3. The time information may have any layout that allows the user to mark a time on a form without having to rely on handwriting recognition software. For example, in an alternate data form, the hour and minute information may include a first group of boxes, one for each of 12 hours on a clock face, and a second group of boxes, one for each of 60 minutes. One box from each group and the AM/PM box may be filled in for the correct time.

FIG. 4 illustrates an example of the capture data format that may be used in embodiments of the present invention. In this example, the user drew the minute hand 410 and the hour hand 420 and filled in the AM/PM box using an "X" mark 430 on the paper data form to indicate the time 8:01 AM. The capture device digitally captured the hands 410, 420 and the "X" mark 430 as time ordered coordinates. Here, (a1,b1) and (a2,b2) are the end coordinates for the minute hand 410, (a3,b3) and (a4,b4) are the end coordinates for the hour hand 420, and (a5,b5) are the coordinates for the "AM" box. The user entered the time information in the following order: drew the minute hand, drew the hour hand, checked the AM box. Hence, the corresponding coordinates were uploaded to the computer in that order, as illustrated by 440. The processor 220 may map the unique coordinates to the hour, minute, and AM/PM, i.e., 8:01 AM, to which they belong. The processor 220 may further use the ordering as indication of when the marks were made, i.e., relative to each other.

When drawing lines in embodiments of the present invention, the capture device 160 may digitally capture one or more (x,y) coordinates along the trajectory of the drawn line, depending on the application. In this example, the capture device 160 captures the two end point coordinates of the minute and hour hands 410, 420. The capture device 160 also captures one coordinate pair for the "X" mark 430. In general, "X" mark 430 may provide four coordinate pairs, two for each line of the "X."

Figure 5:
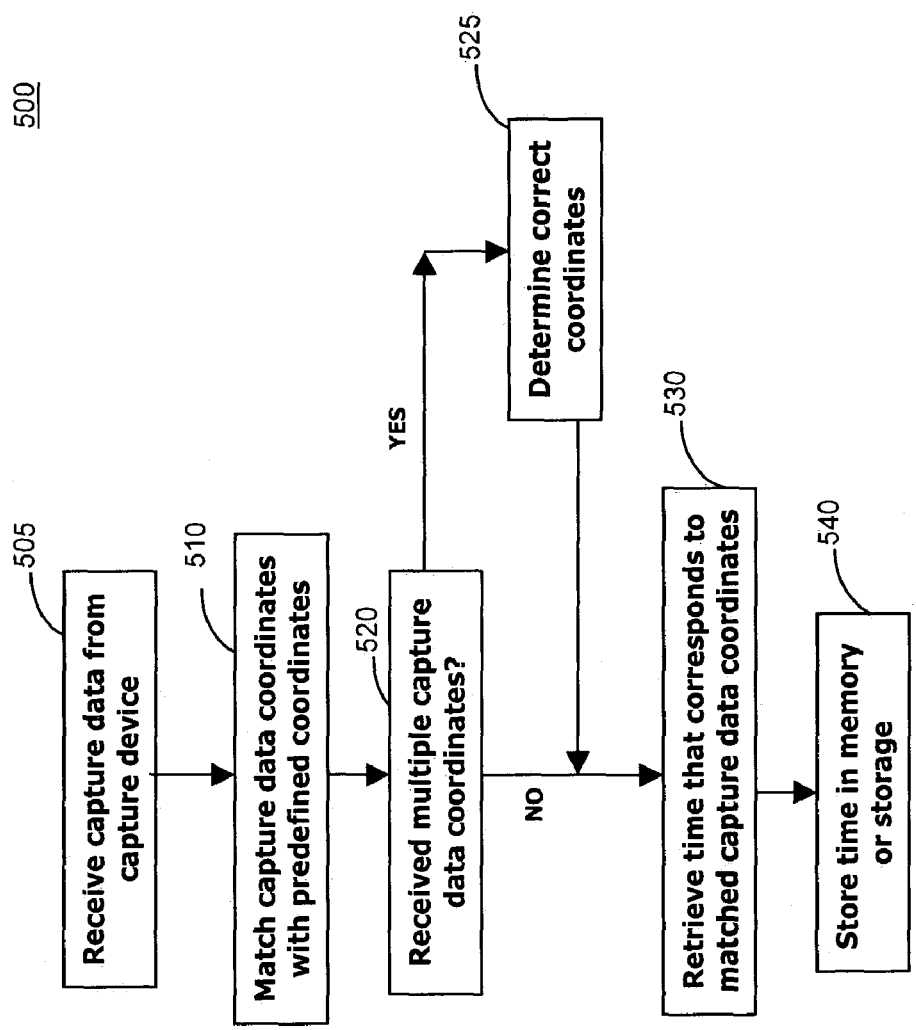
FIG. 5 is a flowchart of an embodiment of a method according to the present invention.

FIG. 5 is a flowchart of an embodiment of a method for recognizing time information according to the present invention. The processor 220 may receive (505) capture data from the capture device 160. As stated previously, the capture data may include, but is not limited to, a time-ordered set of coordinates indicating when and where on a paper data form a set of marks was made to fill in the correct time. The processor 220 may then compare (510) the set of coordinates with a set of predefined coordinates in memory 230 or storage 240 to find a match for the hour, minute, and AM/PM. The predefined coordinates may define the expected unique positions of marks on the paper data form for each hour, minute, and AM/PM in a day.

In a system where a variety of paper data forms may be used, the processor 220 may also receive the form identification from the capture device 160. The form identification may be indicated by a set of coordinates, vectors,. etc., indicating where on the paper data form the identification mark was made. Prior to retrieving the predefined coordinates, the processor 220 may compare the form identification coordinates with predefined identification coordinates to find a match. The processor 220 may then determine the predefined coordinates in memory 230 or storage 240 based on the form identification and compare (510) the captured set of coordinates with these determined predefined coordinates.

The only requirements for drawing the hour and minute hands 410, 420 are that the hands 410, 420 meet in the center of the clock face and that the minute hand 410 be longer than the hour hand 420. Alternatively, the minute hand 410 may be wider than the hour hand 420 or any like characteristic that may be used to distinguish between the hands. Accordingly, at least two coordinates in the time ordered sequence 440 may be at or close to the center of the clock face. Coordinates immediately following each of these center coordinates in the sequence may be the outer end points of the minute and hour hands 410, 420. In the example in FIG. 4, the two center coordinates (a1,b1) and (a3,b3) have immediately following coordinates (a2,b2) and (a4,b4), respectively, which indicate the outer end points of the minute and hour hands 410, 420. Using well-known line calculations, the processor 220 may calculate the lengths of the drawn hands 410, 420 and determine the longer hand. The processor 220 may then designate the outer end point corresponding to the longer hand as the minute hand 410 and the outer end point corresponding to the shorter hand as the hour hand 420. These designated points may be used later for further processing.

In an alternate embodiment, the minute hand 410 need not be longer than the hour hand 420. The hands 410, 420 may be differentiated from each other by the order in which they are drawn, where the hour hand 420 is generally drawn first.

In another alternate embodiment, the processor 220 may determine the time using right triangle geometry calculations, rather than predefined coordinate matching. In this instance, the processor 220 may use the hand lengths or drawing order to differentiate between the hands 410, 420. The processor 220 may then determine the angle between the hands 410, 420. Using the angle and the hands' end point coordinates, the processor 220 may then calculate to which numbers on the clock face the hands 410, 420 are pointing. Hence, the time may be recognized.

Embodiments of the present invention provide a way for the user to correct the time information when the user incorrectly or erroneously fills in the paper form. The user may cross out the incorrect hand or box in question and then draw the correct hand or fill in the correct box. In these instances, the capture device 160 records more than two sets of coordinates in the clock face 340 and/or coordinates for both boxes in the AM/PM group 350. For example, if the user drew the hour hand at 5:00 and then mistakenly drew the minute hand at :05, crossed it out, and correctly drew it at :10, there would be four discrete sets of captured coordinates in the clock face—a first set made when drawing the hour hand, a second set when drawing the :05 minute hand, a third set when crossing out the :05 minute hand, and a fourth set when drawing the :10 minute hand-where each set would be spaced out in time. The processor 220 will have incorrectly received the multiple minute hand coordinates. Using well-known line calculations, the processor 220 may determine which lines intersect, i.e., which hand has been crossed out, and then eliminate those coordinates. The processor 220 may then, using well-know line calculations, calculate the lengths of the remaining drawn hands 410, 420 and determine the longer hand. The processor 220 may designate the outer end point corresponding to the longer hand as the minute hand 410 and the outer end point corresponding to the shorter hand as the hour hand 420.

In the case of the mistaken AM/PM, the processor 220, using well-known line calculations, may determine which of the AM/PM boxes intersects with the cross-out line and eliminate the coordinates of that box. The processor 220 may use the remaining coordinates later for further processing.

So, according to embodiments of the present invention, if the processor 220 receives (520) multiple coordinates for the minute hand, the hour hand, and/or AM/PM, i.e., finds multiple matches with the predefined coordinates, the processor 220 may determine (525) the correct set of coordinates as previously described or in any other manner for determining and eliminating multiple coordinates and, hence, the correct predefined coordinates.

Next, the processor 220 may retrieve (530) from memory or storage the time associated with the predefined coordinates that match the captured set of coordinates. The processor 220 may then store (540) the hour, minute, and AM/PM as the time the user marked on the form.

The processor 220 may alternatively retrieve the predefined coordinates from memory or storage, one at a time or together, prior to the comparison with the captured set of coordinates and then store the hour, minute, and AM/PM that match the captured set of coordinates as the time the user marked on the form.

In an alternate embodiment, the capture device 160 may perform both the data capture and the time determination. After which, the capture device 160 may upload the time to the computer 120 for further use or storage.

Embodiments of the present invention may be implemented using any type of computer, such as a general-purpose microprocessor, programmed according to the teachings of the embodiments. The embodiments of the present invention thus also includes a machine readable medium, which may include instructions used to program a processor to perform a method according to the embodiments of the present invention. This medium may include, but is not limited to, any type of disk including floppy disk, optical disk, and CD-ROMs.

It may be understood that the structure of the software used to implement the embodiments of the invention may take any desired form, such as a single or multiple programs. It may be further understood that the method of an embodiment of the present invention may be implemented by software, hardware, or a combination thereof.

The above is a detailed discussion of the preferred embodiments of the invention. The full scope of the invention to which applicants are entitled is defined by the claims hereinafter. It is intended that the scope of the claims may cover other embodiments than those described above and their equivalents.

What is claimed is:

1. A method comprising:
   receiving a set of coordinates from a capture device, the set of coordinates indicating where on a paper data form a set of marks was made without the use of a graphical user interface; and
   mapping the set of coordinates to a time;
   wherein the mapping includes:
      retrieving from memory predefined coordinates indicating where each set of marks corresponding to a time is expected to be made on the capture device;
      comparing the set of coordinates to the predefined coordinates;
      determining which of the predefined coordinates is the closest match to the set of coordinates; and
      storing the time corresponding to the determined predefined coordinates.

2. The method of claim 1, wherein the received coordinates are a set of time ordered coordinates (x,y) of the set of marks on the paper data form.

3. The method of claim 1, wherein the received coordinates are a set of vector coordinates (x,y,t) of the set of marks on the paper data form.

4. The method of claim 1, wherein the coordinates are received simultaneously with the making of the set of marks on the paper data form.

5. The method of claim 1, further comprising:
   receiving a set of points from the capture device, the set of points representing the orientation of the paper data form on the capture device; and
   determining the positions of the sets of marks relative to the set of points.

6. The method of claim 1, further including:
   receiving an identification of the paper data form; and
   retrieving from memory the predefined coordinates based on the identification.

7. A method comprising:

receiving a set of coordinates from a capture device, the set of coordinates indicating where on a paper data form a set of marks was made without the use of a graphical user interface;

mapping the set of coordinates to a time;

wherein the paper data form is attached to the capture device, the data form including a clock face and a pair of boxes associated with AM and PM;

wherein the set of marks is made by drawing a minute hand and an hour hand on the clock face and checking one of the pair of boxes.

8. The method of claim 7, further comprising:

resolving the drawing of multiple minute or hour hands on the clock face, including receiving multiple sets of coordinates corresponding to the multiple minute or hour hands and a cross-out line, the cross-out line having been drawn across the incorrect minute or hour hand, determining which of the multiple sets of coordinates correspond to intersecting lines, the intersecting lines being the incorrect minute or hour hand and the cross-out line, and eliminating the determined sets of coordinates of the intersecting lines.

9. The method of claim 7, further comprising:

resolving the checking of multiple AM/PM boxes, including receiving multiple sets of coordinates corresponding to the multiple boxes and a cross-out line, the cross-out line having been drawn across the incorrect box, determining which of the multiple sets of coordinates corresponding to the boxes intersects with the set of coordinates corresponding to the cross-out line, and eliminating the determined set of coordinates of the incorrect box and the cross-out line.

10. A method comprising:

receiving a set of coordinates from a capture device, the set of coordinates indicating where on a paper data form a set of marks was made without the use of a graphical user interface; and mapping the set of coordinates to a time;

wherein the paper data form is attached to the capture device, the data form including a plurality of boxes, a first group of the boxes being associated with 12 hours in a clock face, a second group of the boxes being associated with 60 minutes in an hour, and a third group of boxes being associated with AM/PM, wherein each box in the first group corresponds to one of the hours, each box in the second group corresponds to one of the minutes, and each box in the third group corresponding to AM or PM.

11. The method of claim 10, wherein the set of marks is made by checking one box from each of the first, second, and third groups.

12. A system, comprising:

a memory;

a processor in communication with the memory, the processor executing a set of instructions to:

receive a set of coordinates from a capture device, the set of coordinates indicating where on a paper data form a set of marks was made without the use of a graphical user interface;

retrieve from the memory predefined coordinates indicating where each set of marks corresponding to a time is expected to be made on the capture device;

compare the set of coordinates to the predefined coordinates;

determine which of the predefined coordinates is the closest match to the set of coordinates; and store the time corresponding to the determined predefined coordinates.

13. The system of claim 12, the processor further to execute instructions to receive additional capture data that indicates when and where the set of marks was made on the paper data form.

* * * * *